United States Patent

Henze et al.

[11] Patent Number: 5,803,215
[45] Date of Patent: Sep. 8, 1998

[54] METHOD AND APPARATUS FOR CHARGING A PLURALITY OF ELECTRIC VEHICLES

[75] Inventors: Christopher P. Henze, Lakeville; Kenneth E. Nicholls, Eden Prairie, both of Minn.

[73] Assignee: Schott Power Systems Incorporated, Wayzata, Minn.

[21] Appl. No.: 787,208

[22] Filed: Jan. 22, 1997

[51] Int. Cl.⁶ ........................................ H02J 7/00
[52] U.S. Cl. ............................... 191/2; 320/109
[58] Field of Search ........................ 191/2, 3, 4, 5, 191/8; 320/2, 15, 22, 27, 28, 29, 30, 35, 36, 43, 48, 104, 107, 108, 109, 111, 125, 137, 138, 150

[56] References Cited

U.S. PATENT DOCUMENTS

| | | | |
|---|---|---|---|
| 3,597,673 | 8/1971 | Burkett et al. | 320/5 |
| 3,614,583 | 10/1971 | Burkett et al. | 320/5 |
| 3,617,851 | 11/1971 | Puy et al. | 320/22 |
| 3,881,581 | 5/1975 | Richardson | 191/2 |
| 3,888,336 | 6/1975 | Zajic | 191/2 |
| 3,940,680 | 2/1976 | Takokoro et al. | 191/5 |
| 4,016,474 | 4/1977 | Mason | 320/15 |
| 4,091,319 | 5/1978 | Nguyen | 191/4 |
| 4,211,969 | 7/1980 | Steigerwald | 320/14 |
| 4,253,054 | 2/1981 | Steigerwald | 320/14 |
| 4,385,269 | 5/1983 | Aspinwall et al. | 320/14 |
| 4,740,739 | 4/1988 | Quammen et al. | 320/14 |
| 4,800,328 | 1/1989 | Bolger et al. | 191/4 |
| 4,956,597 | 9/1990 | Heavey et al. | 320/14 |
| 5,057,762 | 10/1991 | Goedken et al. | 320/15 |
| 5,119,008 | 6/1992 | Morita et al. | 320/2 |
| 5,179,335 | 1/1993 | Nor | 320/21 |
| 5,184,058 | 2/1993 | Hesse et al. | 320/4 |
| 5,200,686 | 4/1993 | Lee | 320/2 |
| 5,202,617 | 4/1993 | Nor | 320/2 |
| 5,204,611 | 4/1993 | Nor et al. | 320/21 |
| 5,206,578 | 4/1993 | Nor | 320/14 |
| 5,254,930 | 10/1993 | Daly | 320/15 |
| 5,263,565 | 11/1993 | Wilkinson | 194/216 |
| 5,311,112 | 5/1994 | Creaco et al. | 320/15 |
| 5,323,098 | 6/1994 | Hamaguchi et al. | 191/4 |
| 5,355,073 | 10/1994 | Nguyen | 320/15 |
| 5,371,454 | 12/1994 | Marek | 320/15 |
| 5,396,163 | 3/1995 | Nor et al. | 320/21 |
| 5,449,995 | 9/1995 | Kohchi | 320/15 |
| 5,483,144 | 1/1996 | Marek | 320/2 |
| 5,498,950 | 3/1996 | Ouwerkerk | 320/35 |
| 5,548,200 | 8/1996 | Nor et al. | 320/27 |
| 5,568,036 | 10/1996 | Hulsey et al. | 320/2 |
| 5,594,318 | 1/1997 | Nor et al. | 320/2 |
| 5,640,059 | 6/1997 | Kammiller et al. | 320/35 |

FOREIGN PATENT DOCUMENTS 7403570  9/1975  Netherlands ........................ 191/2

*Primary Examiner*—Mark Tuan Le
*Attorney, Agent, or Firm*—Westman, Champlin & Kelly, P.A.; S. Koehler

[57] ABSTRACT

A method and apparatus for charging batteries of a plurality of vehicles includes a power source converter connectable to a power source to receive electrical power and for converting the electrical power to a selected voltage potential that is distributed on a distribution bus. A plurality of vehicle connecting stations are connected to the distribution bus. Each vehicle connecting station includes a station power converter for receiving electrical power from the power source converter for charging the battery and a station controller to control electrical power flow to the vehicle battery.

31 Claims, 2 Drawing Sheets

METHOD AND APPARATUS FOR CHARGING A PLURALITY OF ELECTRIC VEHICLES

BACKGROUND OF THE INVENTION

The present invention relates to a method and apparatus for charging a plurality of electric vehicles.

Electric vehicles are being developed as an alternative to vehicles powered by petroleum based fuels such as gasoline. Advantages of electrically powered vehicles include the lack of exhaust pollutants emitted during the combustion process as well as a reduction in noise.

As is well known, one of the significant drawbacks to an electric vehicle is the storage capabilities of on-board batteries used to power the vehicle. Typical commuter electric vehicles have onboard batteries that have a capacity of 25 kW-hr to 50 kW-hr. This amount of energy will allow the vehicle to operate for a limited period of time, depending on the terrain, the speed of operation and the number of miles traveled before the batteries must again be recharged. It is believed that buses or other larger vehicles will have to be charged on a daily basis, if not more frequently.

Known modern electric vehicle battery charger systems are typically self-contained units for charging a single vehicle. A typical prior art charger system includes a utility interface having over-current protection, EMI filtering and lightening protection. Preferably, a high power factor rectifier and a low pass filter convert alternating current utility power to a direct current (DC)—A switch-mode DC-AC inverter operating at high radio frequencies (RF) and a RF rectifier and another low pass filter transfer power to a device connectable to the vehicle battery. Overall control of the battery charging system is performed on the vehicle, although it may also be controlled off the vehicle. A battery management system sends signals to the off-board charger to adjust the current delivered to the battery or batteries. Complex charge algorithms are used in order to maximize efficiency and fully charge the batteries. A controller in the off-board charger receives the signals from the battery management system and sends signals to the switch-mode DC-AC inverter in order to respond to the demand of the battery management system.

The components of the electric vehicle battery charger system can be located on or off the vehicle. At some point, the power must be coupled to the vehicle in order to charge the batteries. This coupling is performed by an interface device that determines which components of the charging system are on the vehicle and which are off the vehicle. The Society of Automotive Engineers (SAE) have advanced three techniques for electric vehicle charging systems. These techniques are differentiated from each other by the physical and electrical characteristics used to couple the charging system to the vehicle and transfer power to the vehicle battery The three techniques include AC conductive coupling, DC conductive coupling and inductive coupling. AC conductive coupling requires electrically connecting, typically 115 (VRMS) or 230 VRMS at 60 Hz or 50 Hz, to an on-board charger that converts the AC energy to DC energy. The DC energy is used to charge the batteries. AC conductive coupling is typically used at power levels below 8 kW in order to reduce the size and weight of the on-board charger.

Unlike AC conductive coupling, DC conductive coupling typically uses an off-board charger to control and vary the energy provided to the batteries. A direct current, typically at voltages between 100 Vdc and 500 Vdc is brought to, and using a suitable connector, is connected to the vehicle batteries. DC conductive coupling has been used at power levels over 100 kW.

Inductive coupling includes a take-apart transformer to inductively couple high frequency AC power from an off-board charger to an on-board rectifier. Typically, operating frequencies are between 100 kHz and 400 kHz. The rectifier converts the high frequency alternating current to direct current for charging the battery.

Electric vehicle battery charging can be done overnight with equalization or rapidly without equalization. "Equalization" ensures each battery of a plurality of batteries connected in series retains approximately the same charge. To equalize the batteries in an electric vehicle, energy must be provided in relatively small amounts (typically 1 kW or less) and for an extended time (typically four or more hours). This charging technique fully charges each of the batteries and has been shown to increase the useful life of the batteries. During rapid charging, power is provided to the batteries at the maximum rate allowed. Total power transfer can be in the range of 25 kW to 300 kW; however, the charging time is typically a half hour or less.

From the foregoing, it is clear that neither a standard charging technique or standard charging time exists for battery charging. Depending on the vehicle, it may be more efficient to charge the vehicle batteries overnight when electric demand is low, while other vehicles, such as buses, may require rapid charging in order to effectively use the vehicle, Therefore, a simple and cost effective system is needed to charge many types of vehicles having differing levels of priority, different battery voltages, and different states of charge, at the same time.

SUMMARY OF THE INVENTION

A method and apparatus for charging batteries of a plurality of vehicles includes a utility power converter connectable to a utility system to receive electrical power and for converting the electrical power to a selected voltage potential that is distributed on a distribution bus. A plurality of vehicle connecting stations are connected to the distribution bus. Each vehicle connecting station includes a station power converter for receiving electrical power from the distribution bus for charging the battery and a station controller to control electrical power flow to the vehicle battery. In a preferred embodiment, a supervisory controller is operably connected to each of the station controllers to provide a signal indicative of a maximum charging rate for each vehicle battery.

Another aspect of the present invention is an apparatus for charging a battery of an electric vehicle from a power source. The apparatus includes a power source converter connectable to the power source to receive electrical power and convert the electrical power to a selected voltage potential. A vehicle connecting station receives the selected voltage potential and provides charge to the battery. A temperature sensor provides an output signal indicative of an operating temperature of the power source converter. A controller receives the output signal and controls a rate of charge provided by the vehicle connecting station as a function of the output signal.

DETAILED DESCRIPTION OF THE PREFERRED EMBODIMENTS

Figure 1:
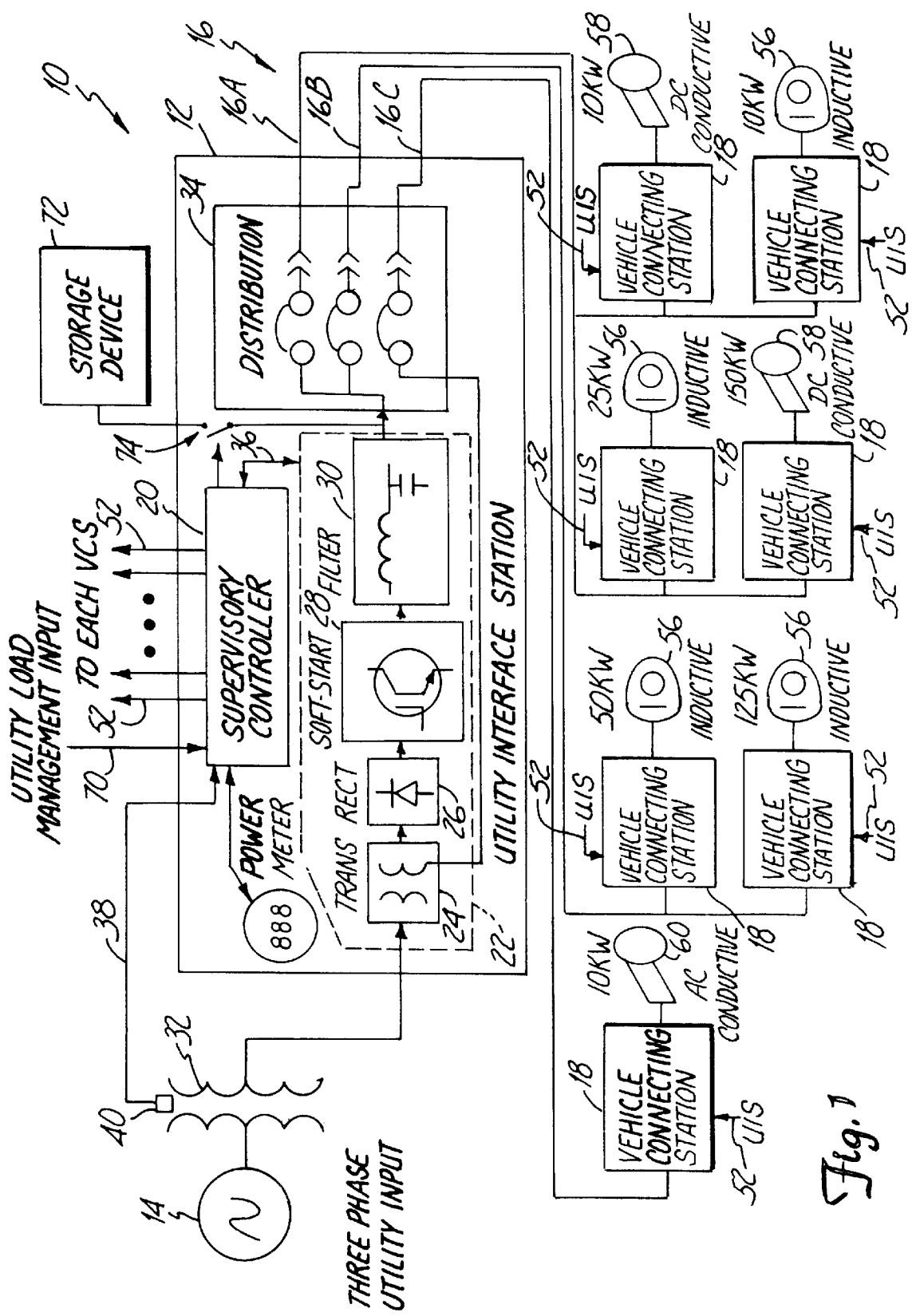
FIG. 1 is a schematic diagram of an electric vehicle charging system in keeping with the present invention.

An embodiment of an electric vehicle charging system 10 of the present invention is illustrated in FIG. 1. Generally, the electric vehicle charging system 10 includes a utility interface station 12 that converts electric power supplied from a source of electric power 14, such as a utility system grid, to a distribution bus 16. Individual vehicle connecting stations 18 are supplied power from the distribution bus 16. Each of the vehicle connecting stations 18 are rated to supply a maximum amount of power to a vehicle connected thereto. Preferably, the electric vehicle charging system 10 includes vehicle connecting stations 18 rated at different power capacities to handle vehicles with different battery storage capacities and/or supply power to vehicles with different levels of priority. By using the single utility interface station 12 and multiple vehicle connecting stations 18, the electric vehicle charging system 10 can simultaneously charge a number of electric vehicles at a central location. For example, the electric vehicle charging system 10 can be operated by a fleet operator who owns a number of electric vehicles such as delivery vehicles, golf carts, fork lifts or the like. In another embodiment, the electric vehicle charging system 10 can be used to charge electric vehicle batteries for consumers in the case of a public charging station.

The vehicle connecting stations 18 communicate with a supervisory controller 20 in the utility interface station 12. The supervisory controller 20 provides a signal to each of the vehicle connecting stations 18 indicative of a maximum charging rate for the vehicle battery connected thereto. In this manner, the rates of charging between the vehicles can be adjusted as desired. Therefore, the supervisory controller 20 can control the amount of power provided to each vehicle and charge vehicles having higher priority faster than vehicles of lower priority. As stated above, the utility interface station 12 receives electric power from the source 14. Typically, the source 14 comprises a three-phase alternating current supplied from utility system grid, but the source 14 could also be a wind generator, a solar array, or other devices generating electric power.

In the embodiment illustrated, the alternating current electric power is converted to direct current electric power for distribution on the distribution bus 16 by a power source converter 22. Conversion of AC current to DC current is well known and a suitable power source converter 22 includes a transformer 24, a rectifier circuit 26, a soft-start circuit 28 and a filtering circuit 30. The transformer 24 typically includes a three-phase input winding for receiving power from the source 14. Multiphase output windings are provided in the transformer 24 and are connected to the rectifier circuit 26 in order to provide high power factor rectification. The transformer 24 can easily accommodate multiple input voltages found in the U.S. as well as those typically used in Europe and Japan. Input windings of the transformer 24 can be directly connected to the utility system grid at a distribution voltage level of, for example, 13.6 kV or 12.5 kV, thereby eliminating the need for a separate utility distribution step-down transformer. In this manner, the transformer 24 combines a utility distribution transformer with an isolating transformer for the power converter 22. In this preferred embodiment, significant cost savings are realized since a separate utility step-down transformer is not required. However, as illustrated, a utility distribution step-down transformer 32 can be operably connected between the source 14 and the transformer 24, if desired.

The power source converter 22 converts the AC power to a selected voltage potential that is provided to a distribution panel 34. The distribution panel 34 includes suitable contactors, circuit breakers or fuses for circuit protection of the distribution bus 16. The supervisory controller 20 communicates with the power source converter 22 along a signal line 36. The supervisory controller 20 provides control signals as necessary for operation of the power source converter 22 and receives signals from the power source converter 22 indicative of performance, such as temperature measurements indicating the temperature of the power electronics used in the rectifier circuit 26, or the transformer 24. The supervisory controller 20 also can receive a temperature signal on a signal line 38 from a sensor 40 measuring the temperature of the step-down transformer 32 or other power conversion devices. Monitoring the temperature of power conversion devices such as the transformer 24, the rectifier circuit 26 or the step-down transformer 32, has the further advantage of allowing these devices to be overloaded for a limited period of time until the temperature becomes too high, because the thermal time constant of these devices can be relatively long, on the order of eight hours. This allows the utility interface station 12 to be rated at a steady-state output power less than the sum of the power deliverable from the vehicle connecting stations 18 whereby, for short durations of time, the utility interface station 12 can supply power in excess of the stready-state rated output power so long as the temperature limits of the power conversion devices such as the transformer 24, the rectifier circuit 26 and the step-down transformer 32 are not exceeded.

It should be understood that measuring operating parameters of the power conversion devices and allowing these devices to exceed their steady-state rated output power for short durations of time is not limited to a system 10 having a plurality of vehicle connecting stations 18. Specifically, a single vehicle connecting station 18 can be operably connected to receive power from the power source converter 22 wherein the power obtainable from the vehicle connecting station 18 exceeds the stready-state rated power of the power source converter 22 for a period of time.

Figure 2:
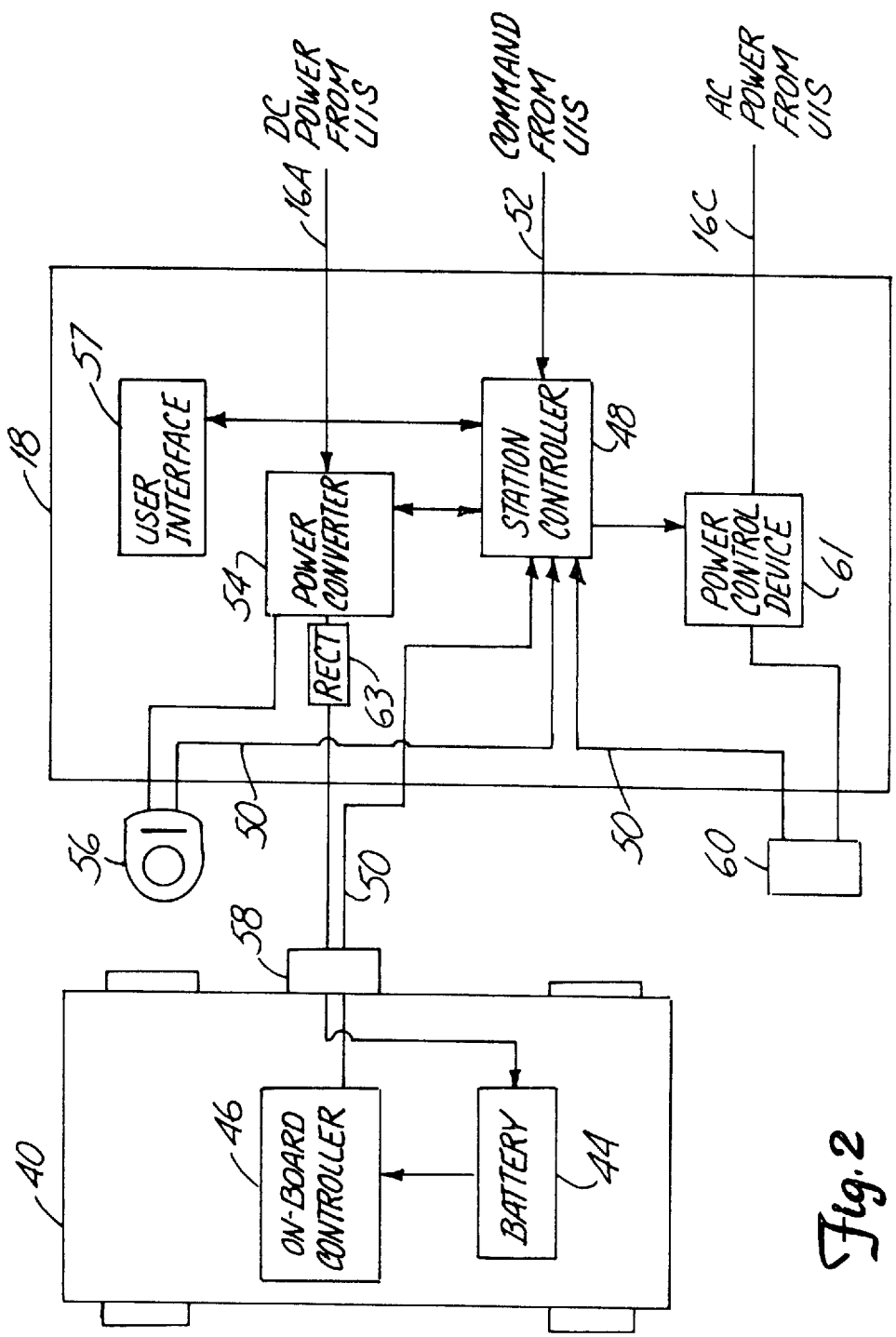
FIG. 2 is a schematic diagram of a vehicle connecting station present in the electric vehicle charging system.

Referring also to FIG. 2, a vehicle 40 is shown coupled to a vehicle connecting station 18. The vehicle 40 includes a battery 44 to be charged. Typically, the vehicle 40 also includes an on-board controller 46 that controls or regulates current delivered to the battery 44. The vehicle connecting station 18 includes a station controller 48 that receives signals from the on-board controller 46 herein illustrated by signal line 50. This signal line can be embodied as a metallic pair, a fiber optic line, a radio frequency (RF) signal, or a variety of other known methods of communication. The station controller 48 also receives as an input on a signal line 52 commands from the supervisory controller 20 in the utility interface station 12. The station controller 48 provides signals to a power converter 54 that supplies power to the battery 44. Unlike other known systems for charging a plurality of vehicles, this preferred embodiment of the present invention provides a power converter and a station controller within each vehicle connection station 18 to individually control the rate of charge for each vehicle battery 44. In this manner, the rate at which the battery 44 is charged is controlled not only as a function of requests made by the on-board controller 46 (or an off-board controller, i.e. station controller which ascertains charging parameters for the battery 44 when the on-board controller 46 is not present), but also, as a function of signals provided by the supervisory controller 20. This allows the system 10 to prioritize the charging of the vehicles connected to the vehicle connecting stations 18, thereby allowing one or several vehicles to be charged faster or before other vehicles. For instance, this allows charging to be done with equalization or rapidly without equalization. "Equalization" ensures each battery of a plurality of batteries connected in series within a vehicle retains approximately the same charge. To equalize the batteries in an electric vehicle, energy must be provided in relatively small amounts (typically 1 kW or less) and for an extended time (typically four or more hours). This charging technique fully charges each of the batteries and has been shown to increase the useful life of the batteries. During rapid charging, power is provided to the batteries at the maximum rate allowed, for instance when a bus or other similar vehicle must be charged. Total power transfer can be in the range of 25 kW to 300 kW; however, the charging time is typically a half hour or less. Unlike other known systems for charging a plurality of vehicles, this embodiment of the present invention controls the charge rate of each of the vehicle connecting stations 18 thereby providing more flexibility for the system operator.

In a further embodiment, the distribution bus 16 carries at least two different voltage potentials, preferably with a first voltage potential being DC and a second voltage potential being AC. In FIG. 1, busses 16A and 16B carry DC power and are connected through the distribution panel 34 to the power source converter 22, is while bus 1GC carries AC power and is connected through the distribution panel 34 to the output windings of the transformer 24. In this manner, if desired, some of the vehicle connecting stations 18 can be suitably equipped to provide AC power to a vehicle battery connected thereto without the need for a separate DC-AC converter, while others utilize DC power. This saves manufacturing costs as well as increases the flexibility of the system 10.

In FIG. 2, the vehicle connecting station 18 receives both AC and DC power from busses 16A and 16C. In this embodiment, the AC power is available from an AC conductive coupler Go and is controlled by a suitable power control device 61 operating from command signals received from the station controller 48. The DC power is used to provide DC current to the vehicle through a rectifier 63 and a DC conductive coupler 58, or inductively through a coupler 56. The couplers 56 and 60 include communication lines 50 for communication with the on-board controller 46. By having multiple couplers, the vehicle connecting station 18 is not limited in the type of electric vehicle that can be connected thereto and charged, but rather, can charge batteries of electric vehicles having different charging systems.

The vehicle connecting station 18 further includes a user interface 57 suitable for the operation of the electric vehicle charging system 10. Generally, the user interface 57 includes a suitable display indicating the status of the charging process and a control panel for operation of the charging process. If the electric vehicle charging system 10 is operated as a public charging station, the user interface 57 can include credit card readers and printers for customer receipts.

Referring back to FIG. 1, in a further embodiment, the supervisory controller 20 receives a signal on a signal line 70 from the operator of the source 14. The signal on signal line 70 can represent the maximum available power or rate of power to be received from the source 14. The supervisory controller 20 regulates the maximum charging rate or power delivered to each of the vehicles connected to the vehicle connecting stations 18 in order not to exceed this limit.

In a further embodiment, a storage device 72, such as batteries, a fuel cell, a flywheel, or the like, is connectable to the utility interface station 12. The storage device 72 stores electric power obtained during off-peak hours when the price of energy from the source 14 is lower. The storage device 72 can then be connected to supply energy to the distribution bus 16 as needed when energy is required during peak hours. The supervisory controller 20 provides suitable command signals to a switching device 74 for connection of the storage device 72 to the utility interface station 12. Alternatively, or in combination, energy from solar or wind sources can also be used in the system 10 with the source 14.

Although the present invention has been described with reference to preferred embodiments, workers skilled in the art will recognize that changes may be made in form and detail without departing from the spirit and scope of the invention.

What is claimed is:

1. An electric vehicle charging system receiving power from a power source and charging batteries of a plurality of vehicles, the system comprising:

a power source converter connectable to the power source to receive electrical power and for converting the electrical power to a selected voltage potential;

a distribution bus for carrying the selected voltage potential;

a plurality of vehicle connecting stations connected to the distribution bus wherein each vehicle connecting station comprises:

a station power converter having input terminals connected to the distribution bus for receiving electrical power from the power source converter at the selected voltage potential, and a coupler connectable to a vehicle battery; and a station controller operably connected to the station power converter to control electrical power flow to the vehicle battery; and means for measuring a temperature of the power source converter and allowing the power source converter to exceed a steady-state rating as a function of temperature of the power source converter.

2. The electric vehicle charging system of claim 1 wherein the distribution bus carries a second voltage potential, and wherein a first one of said station power converters is connected to the distribution bus to receive the first-mentioned voltage potential and a second one of said station power converters is connected to receive the second voltage potential.

3. The electric vehicle charging system of claim 2 wherein the first-mentioned voltage potential is DC and the second voltage potential is AC.

4. The electric vehicle charging system of claim 1 wherein at least one station controller ascertains charging parameters for charging the corresponding battery.

5. The electric vehicle charging system of claim 1 and further comprising a supervisory controller operably connected to each of the station controllers to provide a signal indicative of a maximum charging rate of the corresponding vehicle battery.

6. The electric vehicle charging system of claim 5 wherein each station power converter has a steady-state power converting rating, and wherein a sum of the steady-state power converting ratings of the plurality of vehicle connecting stations exceeds a steady-state power converting rating of the power source converter.

7. The electric vehicle charging system of claim 5 and further comprising a sensor for sensing an operating state of the power source converter and providing a signal indicative of the operating state to the supervisory controller, and wherein the supervisory controller provides signals to each of the station controllers as a function of the operating state of the power source converter.

8. The electric vehicle charging system of claim 1 wherein the power source converter includes a transformer and the means for measuring measures a temperature of the transformer.

9. The electric vehicle charging system of claim 1 wherein the supervisory controller includes an input terminal for receiving a signal indicative of a maximum rate of power to be drawn from the power source, and wherein the supervisory controller controls at least one of the station controllers as a function of the maximum rate of power to be drawn from the power source.

10. The electric vehicle charging system of claim 1 wherein a first vehicle connecting station of the plurality of vehicle connecting stations includes an inductive coupler, and a second vehicle connecting station of the plurality of vehicle connecting stations includes a conductive coupler.

11. The electric vehicle charging system of claim 10 wherein the conductive coupler comprises an AC conductive coupler.

12. The electric vehicle charging system of claim 10 wherein the conductive coupler comprises a DC conductive coupler.

13. The electric vehicle charging system of claim 10 wherein the selected voltage potential comprises a DC voltage.

14. A method of charging batteries of a plurality of vehicles from a power source, the method comprising:
converting electrical power with a power source converter from the power source to a selected voltage potential;
measuring a temperature of the power source converter;
distributing the selected voltage potential to a plurality of vehicle connecting stations wherein each vehicle connecting station includes a coupler connected to a vehicle battery; and
controlling individually the rate of charge for each vehicle battery as a function of the temperature of the power source and allowing the power source converter to exceed a steady-state rating.

15. The method of claim 14 wherein the step of controlling includes controlling the rate of charge of at least one vehicle battery to equalize the charge in the battery.

16. The method of claim 14 and further providing a signal to each vehicle connecting station indicative of a maximum charging rate provided to each corresponding vehicle battery.

17. The method of claim 14 wherein each vehicle connecting station has a steady-state power supply rating, and wherein a sum of the steady-state power converting ratings of the plurality of vehicle connecting stations exceeds a steady-state power converting rating of the power converted during the step of converting.

18. The method of claim 16 and further comprising a step of obtaining a signal indicative of a maximum rate of power to be drawn from the power source, and wherein the step of providing includes providing signals to the vehicle connecting stations as a function of the maximum rate of power to be drawn from the power source.

19. The method of claim 14 wherein the power source comprises a utility system providing AC power at a distribution level voltage, and wherein the step of converting includes providing a power source converter having a transformer with input terminals connected to the utility system for receiving power at the distribution level voltage, and wherein the step of measuring includes measuring a temperature of the transformer.

20. An electric vehicle charging system for charging batteries of a plurality of electric vehicles from a power source, the electric vehicle charging system comprising:
a power source converter connectable to the power source to receive electrical power and for converting the electrical power to a DC voltage potential;
a distribution bus for carrying the DC voltage potential;
a first vehicle connecting station connected to the distribution bus and having an inductive power coupler for charging a battery of a first vehicle; and
a second vehicle connecting station connected to the distribution bus and comprising a power converter for converting the DC voltage potential to an AC voltage potential; a rectifier connected to the power converter for receiving and rectifying the AC voltage potential; and a DC power coupler connected to the rectifier and connectable to the battery.

21. An electric vehicle charging system for charging a battery of an electric vehicle from a power source, the electric vehicle charging system comprising:
a power source converter connectable to the power source to receive electrical power and for converting the electrical power to a selected voltage potential;
a vehicle connecting station for receiving the selected voltage potential and providing charge to the battery;
a temperature sensor for providing an output signal indicative of an operating temperature of the power source converter; and
a controller receiving the output signal and controlling a rate of charge provided by the vehicle connecting station as a function of the output signal, wherein the controller allows the power source converter to exceed a steady-state rating as a function of the output signal.

22. An electric vehicle charging system for charging a battery of an electric vehicle from a power source, the electric vehicle charging system comprising:
a power source converter connectable to the power source to receive electrical power and for converting the electrical power to a selected voltage potential;
a vehicle connecting station for receiving the selected voltage potential and providing charge to the battery;
a signal line from the power source, wherein the signal line carries a signal indicative of the power to be received from the power source; and
a controller receiving the signal and controlling the power provided by the vehicle connecting station as a function of the signal.

23. The electric vehicle charging system of claim 22 and further comprising a plurality of vehicle connecting stations for receiving the selected voltage potential, wherein the controller controls the power provided by each vehicle connecting station.

24. The electric vehicle charging system of claim 22, wherein the controller controls the maximum charging rate provided by the vehicle connecting station as a function of the signal.

25. The electric vehicle charging system of claim 22 wherein the controller controls the maximum power provided by the vehicle connecting station as a function of the signal.

26. A method of charging a battery of a vehicle from a power source, the method comprising:
converting electrical power with a power source converter from the power source to a selected voltage potential;

receiving a signal from the power source indicative of the power to be converted;

distributing the selected voltage potential to a vehicle connecting station wherein the vehicle connecting station includes a coupler connected to a vehicle battery; and controlling the power delivered to the vehicle battery as a function of the signal.

27. The method of claim 26 wherein the step of distributing comprises distributing the selected voltage potential to a plurality of vehicle connecting stations, wherein each vehicle connecting station includes a coupler connected to a vehicle battery, and wherein the step of controlling includes controlling the power delivered to each vehicle battery as a function of the signal.

28. The method of claim 26 wherein the step of controlling includes controlling the maximum charging rate delivered to the vehicle battery as a function of the signal.

29. The method of claim 26 wherein the step of controlling includes controlling the maximum power delivered to the vehicle battery as a function of the signal.

30. An electric vehicle charging system for charging a battery of an electric vehicle from a power source, the electric vehicle charging system comprising:

a power source converter connectable to the power source to receive electrical power and for converting the electrical power to a DC voltage potential;

a distribution bus for carrying the DC voltage potential;

a vehicle connecting station comprising:

a power converter for converting the DC voltage potential to an AC voltage potential;

a rectifier connected to the power converter for receiving and rectifying the AC voltage potential; and a DC power coupler connected to the rectifier and connectable to the battery.

31. The electric vehicle charging system of claim 30 wherein the vehicle connecting station includes an inductive power coupler connected to the power converter for receiving the AC voltage potential.

* * * * *